United States Patent [19]

Matsumoto et al.

[11] Patent Number: 5,291,393
[45] Date of Patent: Mar. 1, 1994

[54] NC MACHINE TOOL APPARATUS HAVING MEANS FOR PRODUCING NC WORK PROGRAM AND METHOD THEREOF

[75] Inventors: Michio Matsumoto, Numazu; Tomoo Hayashi, Gotenba; Motoyuki Miyauchi, Tagata; Kenji Kato, Numazu; Takao Adachi, Tagata, all of Japan

[73] Assignee: Toshiba Kikai Kabushiki Kaisha, Tokyo, Japan

[21] Appl. No.: 779,193

[22] Filed: Oct. 22, 1991

[30] Foreign Application Priority Data

Oct. 22, 1990 [JP] Japan .................. 2-284069
Oct. 15, 1991 [JP] Japan .................. 3-294913

[51] Int. Cl.⁵ .............................. G06F 15/46
[52] U.S. Cl. .................... 364/191; 364/474.03; 364/474.37
[58] Field of Search ........... 364/191, 474.03, 474.37; 318/578; 409/80, 84, 85

[56] References Cited

U.S. PATENT DOCUMENTS

| | | | |
|---|---|---|---|
| 3,624,371 | 11/1971 | Neal | 364/474.03 |
| 4,534,685 | 8/1985 | Komiya et al. | 409/99 |
| 4,702,652 | 10/1987 | Rokksku et al. | 409/84 |
| 4,746,251 | 5/1988 | Yoshikawa et al. | 409/84 |
| 4,803,633 | 2/1989 | Kishi et al. | 364/474.03 |
| 4,977,512 | 12/1990 | Nakagawa | 364/474.37 |
| 5,003,484 | 3/1991 | Vollmayr | 364/474.03 |
| 5,015,130 | 5/1991 | Matsuura et al. | 409/80 |

Primary Examiner—Jerry Smith
Assistant Examiner—Paul Gordon
Attorney, Agent, or Firm—Cushman, Darby & Cushman

[57] ABSTRACT

Disclosed is an NC machine tool apparatus including an NC machine having at least one spindle to which a tool or a sensing device is attached, and a drive mechanism for driving the spindle, and a control unit for driving the spindle through the drive mechanism. The control unit is provided with an NC work program producing means for measuring a machining locus of a workpiece held in the NC machine by the sensing device attached to the spindle in accordance with a source work program which defines a measurement of the machining locus of the workpiece and a method of producing an NC work program, and producing the NC work program on the basis of the measured data and the source work program.

19 Claims, 12 Drawing Sheets

FIG. I

| PROGRAM NAME | START ADDRESS | SIZE |
|---|---|---|
| XXX | 001 | 2 |
| MMM | 201 | 1 |
| YYY | 301 | 1 |
| 101 | 401 | 1 |

NC MACHINE TOOL APPARATUS HAVING MEANS FOR PRODUCING NC WORK PROGRAM AND METHOD THEREOF

BACKGROUND OF THE INVENTION

1. Field of the Invention

The present invention relates to a numerical control (NC) machine tool apparatus, more particularly, to a computerized numerical control (CNC) machine tool apparatus having a means for automatically producing an NC work program used therein for machining a workpiece, on the basis of a source NC program.

2. Description of the Related Art

When machining workpiece by a CNC machine tool apparatus, which includes a plurality of spindles, drive mechanisms thereof and a control unit, an NC work program is previously programmed on the basis of parameters describing a machining shape of a workpiece to be machined, machining directions, a speed at which a tool is to be moved and other machining conditions. The programmed NC work program is loaded into a memory of the control unit. Thereafter, the control unit drives the drive mechanisms in accordance with the loaded NC work program to thereby machine the workpiece by the tool mounted on the spindle.

Various methods of programming an NC work program have been adopted, however, these methods suffer from the following disadvantages related to typical prior art programming methods.

When a machining shape of the workpiece is simple, a theoretical calculation method has been attempted. In this method, a skilled programmer or designer calculates a machining shape of the workpiece theoretically, programs a source NC work program represented by an NC language, and loads the source NC work program into a programming computer. The theoretical calculation method is different from an NC machine tool apparatus in which the workpiece is machined to produce an NC work program by, for example, an NC work programed paper tape. The NC work program is tested and loaded into the NC machine tool apparatus via a paper tape. This theoretical calculation method, however, requires skilled programmers, a programming computer for assembling a source NC work program and outputting an actual NC work programmed tape, and requires a long time for the programming.

A measuring method has also been attempted. In this method, an operator operates an NC machine tool apparatus in which a touch sensor, instead of a tool, is attached to a spindle. The touch sensor and measures a machining shape of the workpiece to be machined by the touch sensor. The programmer programs a source NC work program represented by an NC language on the basis of the measured data, and produces an NC work program. This measuring method also suffers from the disadvantages of the need for skilled engineers, a programming computer and a long programming time.

Furthermore, an Interactive programming method, in which an NC work program is produced interactively between a computer and an operator, has been attempted. This method does not require skilled engineers, however, does require a complex and bulky computer system and a long programming time.

Usually, a test operation of the NC work program loaded in the NC machine tool apparatus is attempted before actual machining of a workpiece. If an error of the NC work program is detected, a reprogramming operation must be carried out, and thus programming time becomes even longer, i.e., the efficiency of the programming is further lowered.

In addition to the above disadvantages, in the prior art programming methods, an NC work program must be produced for each machined shape of a workpiece. For example, when a modification is made to a machined shape, slightly different from a source machined shape, a new NC work program must be produced.

SUMMARY OF THE INVENTION

An object of the present invention is to provide an NC machine tool apparatus enabling production of an NC work program and the machining of a workpiece using the NC work program.

Another object of the present invention is to provide a method of producing an NC work program in an NC machine tool apparatus for machining a workplace.

According to the present invention, there is provided an NC machine tool apparatus which includes an NC machine having at least one spindle to which a tool or a sensing device is attached, a drive mechanism for driving the spindle, and a control unit for driving the spindle through the drive mechanism. The control unit is provided with an NC work program producing means for measuring a machining locus of a workpiece held in the NC machine by the sensing device. The sensory device is attached to the spindle, in accordance with a source work program which defines a measurement of the machining locus of the workpiece and a method of producing an NC work program, and produces the NC work program on the basis of the measured data and the source work program.

Preferably, the NC work program producing means includes a memory means for storing the source work program and the NC work program; a measurement means for measuring the machining locus of the workpiece; and a program producing means, cooperating with the measurement means, for producing the NC work program in accordance with the measured data and storing the same in an area of the memory means.

The control unit further includes an open processing means for finding a free area in the memory means, in which the NC work program to be produced is to be stored, and registers a name of the NC work program, a start address of the found free area, and a size of the NC work program to be produced.

The memory means includes a work program storage area divided into a plurality of, each of which sectors is defined by a unit size, and stores the source work program, the NC work program, and a directory table indicating a use of the sectors. The open processing means finds a free area in accordance with contents of the directory table, registers the name of the NC work program to be produced, a start address of the found free area and a size of the NC work program. The open processing means stores the NC work program name in the start address of the found free area.

The control unit further includes a close processing means for storing an end code indicating an end of the produced NC work program to the last address of the sector of the work program storage area in which the NC work program produced by the NC work program producing means is stored.

Preferably, the control unit includes a simulation means for calculating machining data on the basis of the produced NC work program to illustrate a machining locus as a perspective spatial figure, and outputting the calculated machining data in the perspective spatial figure as a simulated machining figure.

Also, preferably, the control unit includes an offset operation means for moving the spindle in accordance with offset NC work data which are obtained by adding a predetermined offset value to contents of the produced NC work program, to thereby move the sensing device or the tool attached to the spindle, apart from the workpiece by the predetermined offset value.

The control unit includes a machining execution means for machining the workpiece held in the NC machine by a tool attached to the spindle, in accordance with the produced NC work program.

The source work program is described in an NC language, and the NC work program is represented by the NC language.

The control unit includes a decoding means. In a program production mode, the decoding means reads the source work program, decodes a command indicating a production of the NC work program and initiates the NC work program producing means, to thereby produce the NC work program. Also, in an actual machining mode, the decoding means reads the produced NC work program, decodes a command indicating a machining of the workpiece and initiates the machining execution means, to thereby machine the workpiece by the tool in accordance with the NC work program.

The control unit includes a computer means for producing the NC work program in accordance with the source work program. The computer means executes the produced NC work program to machine the workpiece.

The NC machine tool apparatus further includes an operator panel connected to the control unit. The operator panel is used as a man-machine interface between an operator and the NC machine tool apparatus.

Also, according to the present invention, there is provided an NC machine tool system including a first NC machine tool apparatus and a second NC machine tool apparatus connected to the first NC machine tool apparatus. The first NC machine tool apparatus includes a first NC machine having at least one spindle to which a tool or a sensing device is attached, a drive mechanism for driving the spindle, and a first control unit for driving the spindle through the drive mechanism. The first control unit is provided with an NC work program producing means for measuring a machining locus of a workpiece held in the NC machine by the sensing device attached to the spindle in accordance with a source work program. The NC work program producing means defines a measurement of the machining locus and a method of producing an NC work program, and produces the NC work program on the basis of the measured data and the source work program.

The second NC machine tool apparatus includes a second NC machine having at least a second spindle to which at least a second tool is attached, a second drive mechanism for driving the spindle, and a second control unit for driving the second spindle through the second drive mechanism. The second control unit is provided with a means for inputting the produced NC work program from the first control means, and a machining execution means for machining a workpiece held in the second NC machine by the second tool attached to the second spindle. In accordance with the input NC work program.

According to the present invention, there is further provided a method of producing an NC work program in an NC machine tool apparatus which includes an NC machine having at least one spindle to which a tool or a sensing device is attached, and a drive mechanism for driving the spindle. The method includes the steps of: measuring a machining locus of a workpiece held in the NC machine by a sensing device attached to the spindle in accordance with a source work program which defines a measurement of the machining locus and a method of producing an NC work program: and producing the NC work program on the basis of the measured data and the source work program.

The method of producing an NC work program further includes the step of finding a free area in which the NC work program to be produced is to be stored, registering a name of the NC work program, a start address of the free area, a size of the NC work program, and storing the name of the NC work program to be produced to the start address of the found free area.

The finding of the free area and registering the information is carried out by using a directory table indicating a use of areas in which NC work programs and source work programs are to be stored.

The method of producing an NC work program further includes the step of storing an end code indicating an end of the produced NC work program to the last address of the area in which the NC work program is stored.

The source work program is described in an NC language, and the NC work program is represented by the NC language.

According to the present invention, there is provided a machine tool apparatus which includes a machining machine having at least one spindle to which a tool or a sensing device is attached, and a drive mechanism for driving the spindle, and a control unit for driving the spindle through the drive mechanism. The control unit is provided with a work program producing means for measuring a machining locus of a workpiece held in the machining machine by the sensing device attached to the spindle in accordance with a source work program. The work program producing means defines a measurement of the machining locus of the workpiece and a method of produces an NC work program, and producing the NC work program on the basis of the measured data and the source work program.

BRIEF DESCRIPTION OF THE DRAWINGS

The above objects and features and other objects and features of the present invention will be described in detail with reference to accompanying drawings, in which

FIG. 4b is a perspective view of a machining locus of the workpiece shown in FIG. 4a;

FIG. 6b is a block diagram of a control unit and an operation unit of the CNC machine tool apparatus shown in FIG. 6a;

DESCRIPTION OF THE PREFERRED EMBODIMENTS

Figure 1:
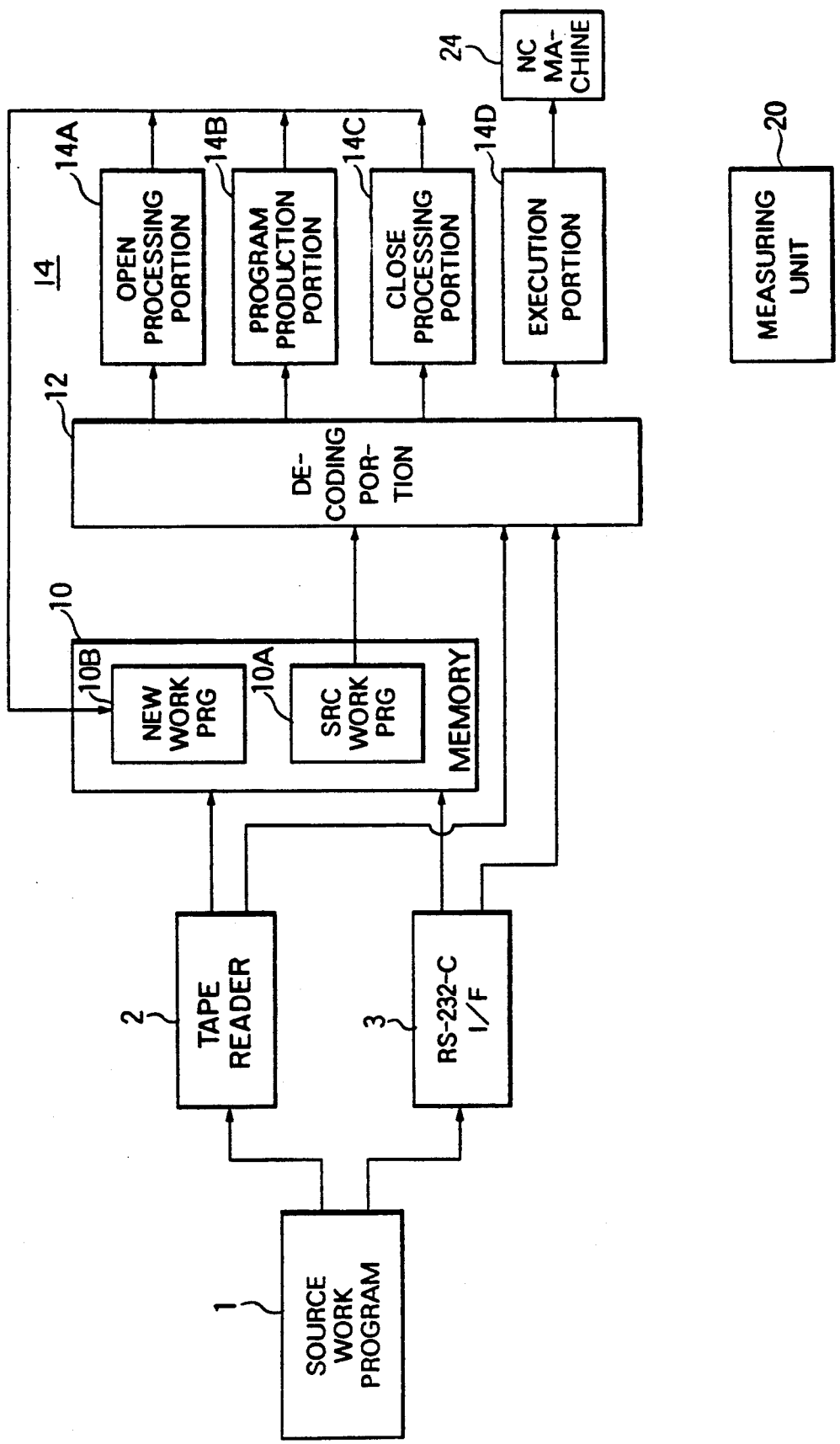
FIG. 1 is a block diagram of a CNC machine tool apparatus of a first embodiment in accordance with the present invention.

FIG. 1 is a block diagram of a CNC machine tool apparatus of the present invention. This CNC machine tool apparatus can be applied to a variety of CNC machine tools, for example, a milling machine, a spark erosion machine, and a machining center.

The CNC machine tool apparatus includes a tape reader 2 and/or an RS232C interface 3, a control unit comprised of a memory 10, a decoding portion 12, an command execution unit 14, a measuring unit 20, and/an NC machine 24. The command execution unit 14 includes an open processing portion 14A, a program production portion 14B, a close processing portion 14C and a machining execution portion 14D. The NC machine 24 includes a plurality of spindles, to one of which a tool is attached; drive mechanisms for driving the spindles; a table on which a workplace is held; and other necessary elements.

Figure 2:
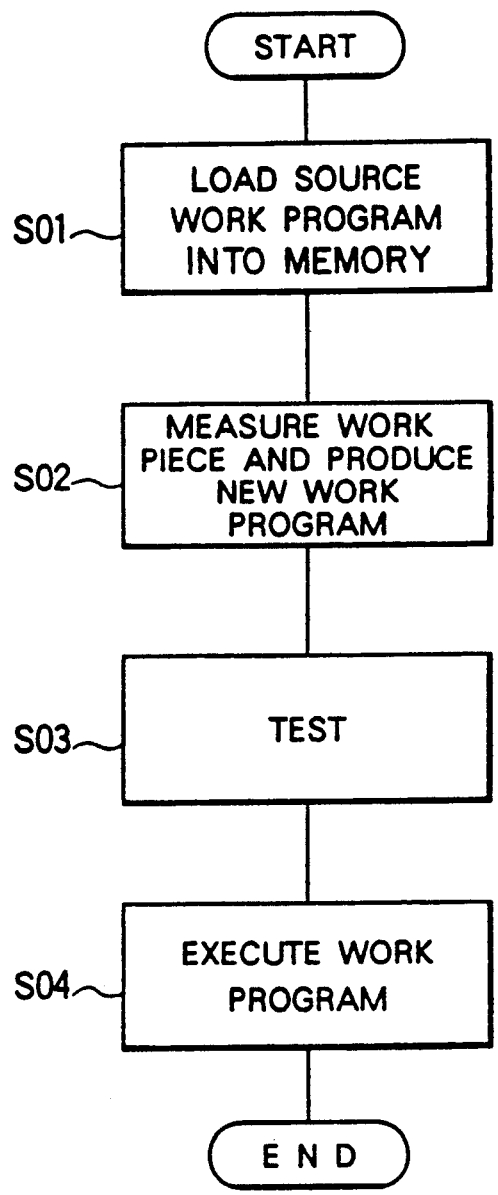
FIG. 2 is a block flow chart explaining a total operation of the CNC machine tool apparatus shown in FIG. 1.

FIG. 2 is a block flow chart explaining a total operation of the CNC machine tool apparatus/with reference to FIG. 1.

At step S01, a source work program 1, which is used for producing an NC work program, is loaded into the memory 10 through the tape reader 2 and/or the RS232C interface 3. An example of the source work program loaded in an area 10A of the memory 10 is shown in Table 1.

At step S02, the control unit cooperates with the measuring unit 20 to measure a machining shape of a workpiece to be machined and mounted on the table of the NC machine 24 and produce an NC work program to be used for actually machining the workpiece, in accordance with the loaded source work program 1 stored in the area 10A in the memory 10. The newly produced NC work program is stored in an area 10B of the memory 10. An example of the NC work program is shown in Table 2.

At step S03, if required, a test operation such as an offset operation or a simulation, of the newly produced NC work program is carried out.

At step S04, an actual machining operation is executed to machine the workpiece in accordance with the newly produced NC work program.

Note that the NC work program is produced in the CNC machine tool apparatus and the produced NC work program is executed by the same CNC machine tool apparatus.

Figure 3:
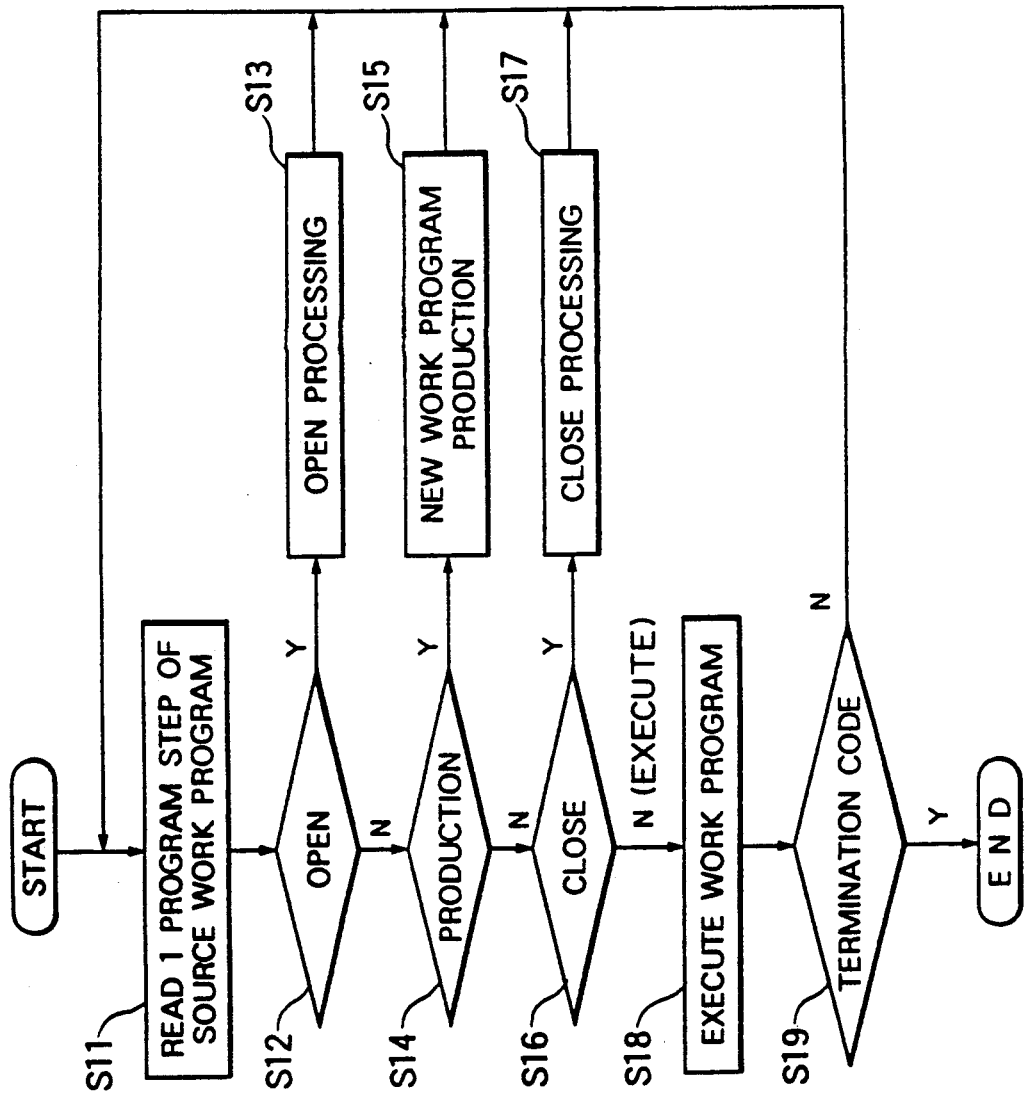
FIG. 3 is a flow chart explaining a production of an NC work program in the CNC machine tool apparatus shown in FIG. 1.

FIG. 3 is a flow chart explaining the operation of the production of the NC work program, as set forth above operation in step S02.

In FIG. 3, at step S11, the decoding portion 12 reads one program step (or one block) of the source work program loaded in the memory 10, and decodes the read program step.

When the decoding portion 12 decodes the read program step as an open command: POPN, V25 as shown in a program step N06 of Table 1, at step S12, the decoding portion 12 initiates the open processing portion 14A. At step S13, the open processing portion 14A finds a free area 10B in the memory 10, in which a new NC work program designated as a number of V25=999 shown in step N01 of Table 1 can be stored, and declares a use of that area 10B, and stores the number 0999 in a first address in the found area 10B, as shown in Table 2.

When the decoding portion 12 decodes the read program step as a production command for producing a new NC work program, as shown in program steps N07 to N24 of Table 1, at step S14, the decoding portion 12 initiates the program production portion 14B. Then, at step S15, the program production portion 14B cooperates with the measuring unit 20 to measure the workpiece on the table of the NC machine 24 by a sensing device such as a touch sensor in accordance with production commands of the source work program, then produces each NC work program step, and stores the same in the area 10B.

Figure 4A:
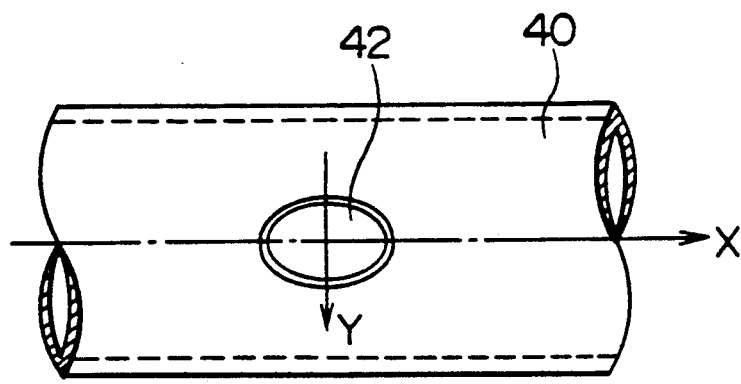
FIG. 4a is a plan view of a workpiece.
Figure 4B:
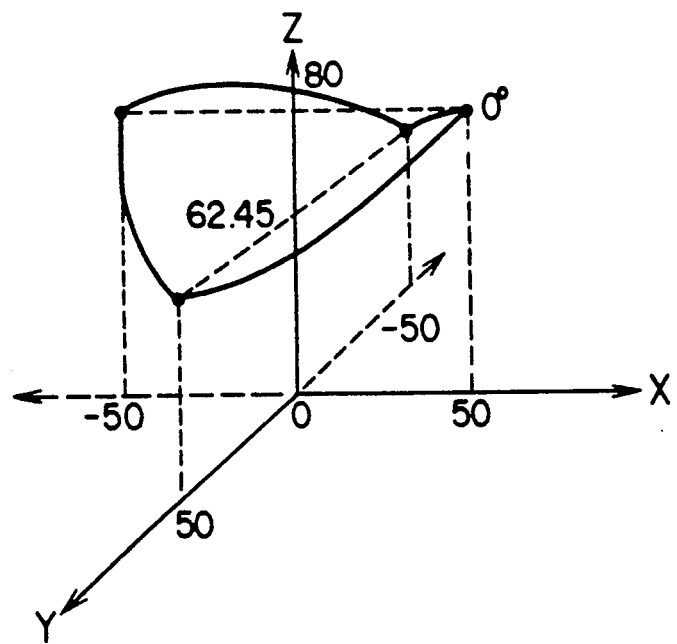

Table 1 shows the source work program for measuring a circle 42 described on a pipe workpiece 40 shown in FIG. 4a, and produces the resultant NC work programs shown in Table 2. FIG. 4b is a perspective view of a machining locus measured in accordance with the source work program, and Table 2 shows the measured three dimensional coordinate values X, Y and Z.

At step S18, when the decoding portion 12 decodes the program step of the source work program as a close command: PCLS, V25 of Table 1 as shown in a program step N25, the decoding portion 12 initiates the close processing portion 14C. Then, in step S17, the close processing portion 14C stores a program end command: M02 shown in a program step N26 of Table 1, in an end of the area 10B, shown as an address of 81 in Table 2.

Upon receiving a request for an actual execution of the new NC work program stored in the area 10B of the memory 10, at step S18, the decoding portion 12 initiates the machining execution portion 14D to machine the workpiece along the newly produced NC work program until the program end command: M02 is decoded at step S19.

As mentioned above, in the NC work production mode, a touch sensor is attached to a spindle in the NC machine 24, instead of of a tool. For example, a drill moved along a machining locus of the circle 42, having a diameter of 100 mm, of the pipe 40 having a diameter of 160 mm, shown in FIG. 4a. The touch sensor, in accordance with the source work program shown in Table 1. Provides measured data as shown in FIG. 4b. This measured data is used to produce the new NC work program as shown in Table 2. Thereafter, the touch sensor is removed from the spindle and, for example, a drill is attached to the spindle, and then the machining is carried out in accordance with the NC program shown in Table 2.

Figure 5:
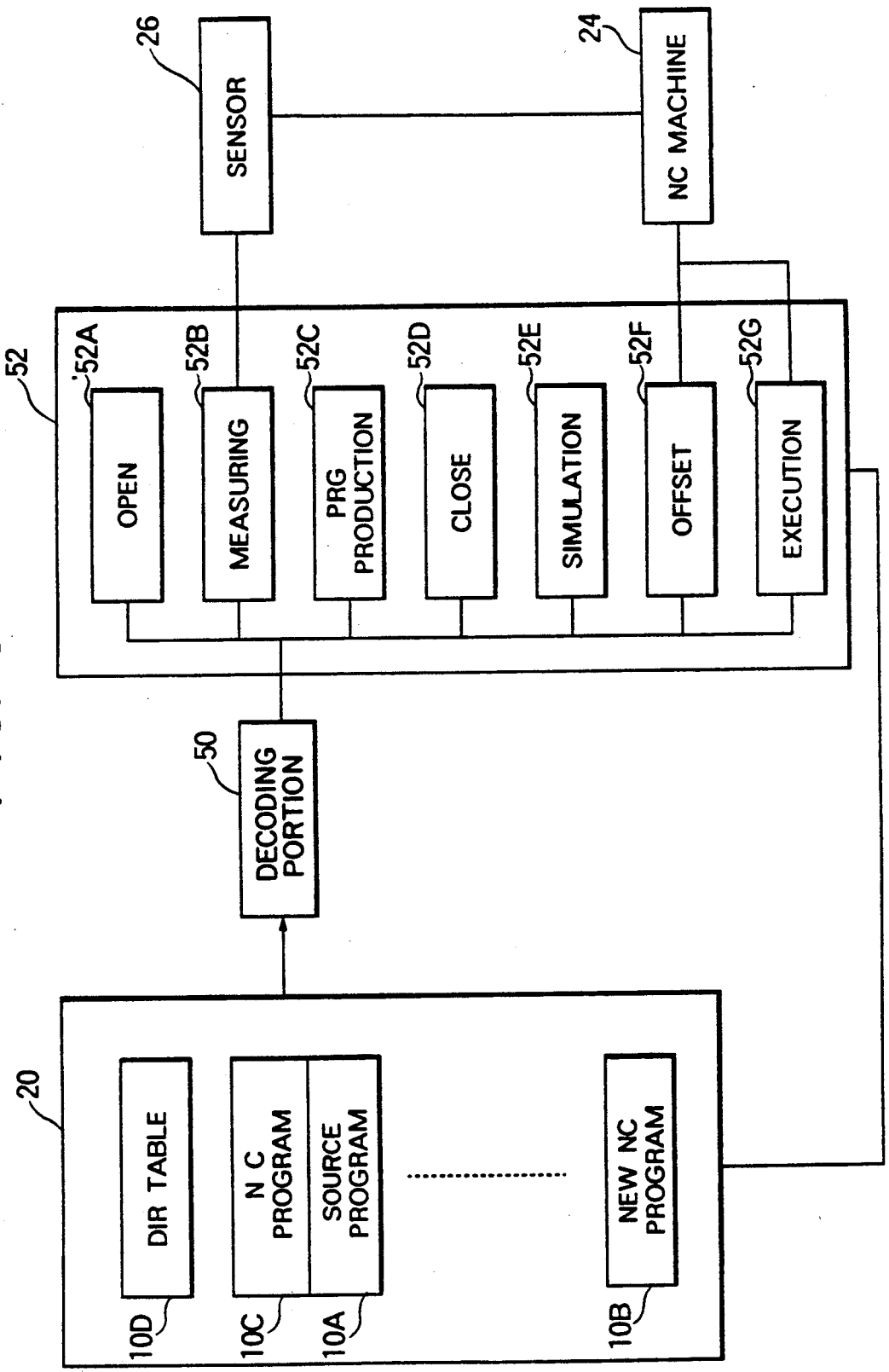
FIG. 5 is a diagram of a CNC machine tool apparatus of a second embodiment in accordance with the present invention.

FIG. 5 is a diagram of a CNC machine tool apparatus of a second embodiment in accordance with the present invention. The CNC machine tool apparatus includes a memory 20, a decoding portion 50, a command execution portion 52, the NC machine 24 and a touch sensor 26. The touch sensor 26 is attached to the spindle in the NC machine 24 when the operation mode is an NC work program production mode. The memory 20, the decoding portion 50, and the command execution portion 52 are formed as a control unit.

The command execution portion 52 includes an open processing portion 52A similar to the open processing portion 14A shown in FIG. 1, a measuring portion 52B, a program production portion 52C similar to the program production portion 14B, a close processing portion 52D similar to the close processing portion 14C, a simulation portion 52E, an offset processing portion 52F, and an execution portion 52G similar to the execution portion 14D.

Figure 6A:
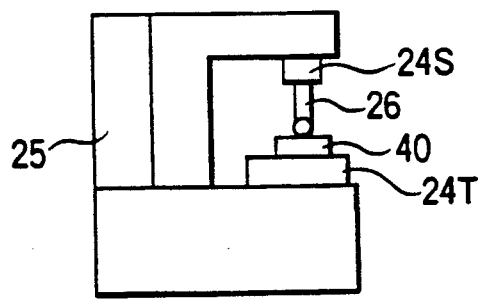
FIG. 6a is a schematic view of the CNC machine tool apparatus shown in FIG. 5.

FIG. 6a is a schematic diagram of the CNC machine tool apparatus having the NC machine 24 and a control unit 25. The NC machine 24 includes a main spindle 24S to which the touch sensor 26 is attached, and a table 24T on which a workpiece 40 is held. The spindle 24S is driven by a drive mechanism to move in a three-dimensional space with respect to the table 24T. In the NC work program production mode, the touch sensor 26 is attached to the spindle 24S. However, in the normal work mode, a tool such as a drill is attached to the spindle 24S.

Figure 6B:
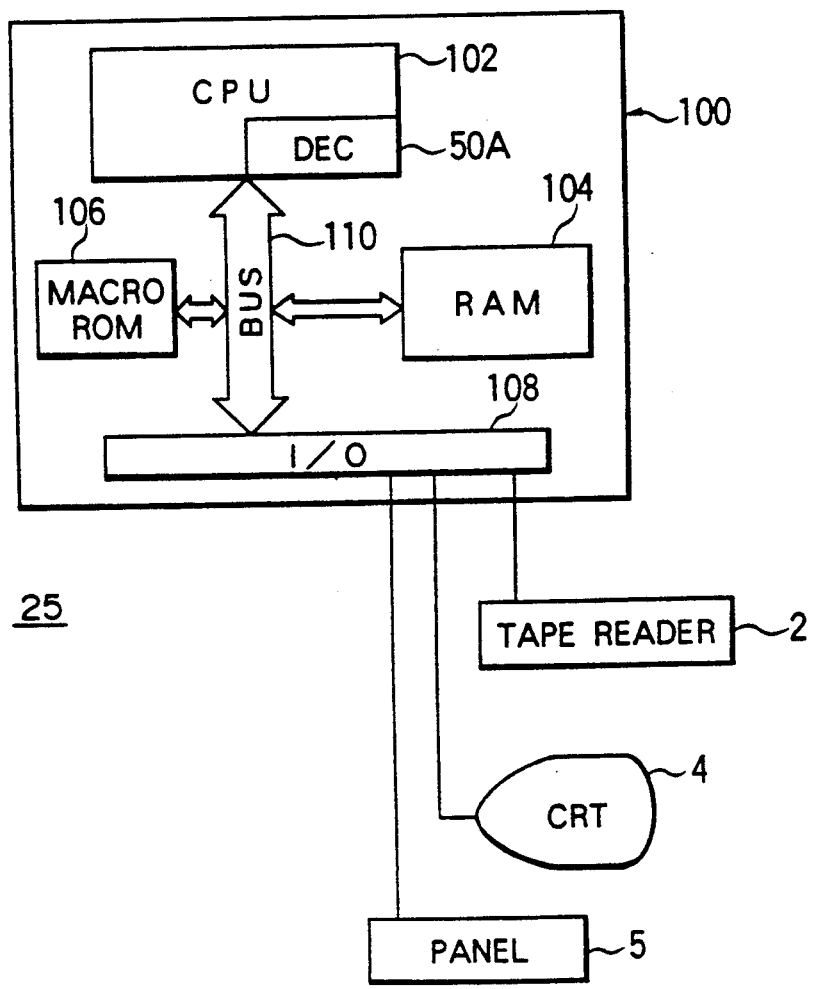

FIG. 6b is a block diagram of the control unit 25. The control unit 25 includes a computer system 100 consisting of a central processor unit (CPU) 102, a random access memory (RAM) 104, a read only memory (ROM) 106, an input/output (I/O) unit 108, a bus 110, a tape reader 2, a CRT display unit 4, and an operation panel 5. In this embodiment, the memory 20 shown in FIG. 5 is realized by the RAM 104, the decoding portion 50 is built-in to the CPU 102 as a decoding circuit 50A, and the command execution portion 52 is realized by programs stored in the ROM 106 and operated in the CPU 102. The decoding circuit 50A decodes NC macro commands (or NC macro instructions) which are written in an NC language and described later in detail. NC control programs performing functions of the above-mentioned portions 52A through 52G in the command execution portion 52 are previously stored in the ROM 106. The NC control program decoded by the decoding circuit 50A is initiated and operated in the CPU 102 and functions as the corresponding command execution portion in the command execution portion 52.

The tape reader 2 is used for loading a source work program as shown in Table 3. The operation panel 5 is used for achieving a man-machine communication between an operator and the CNC machine tool apparatus. The CRT display unit 4 is used for displaying messages, graphs and other information.

Figure 7:
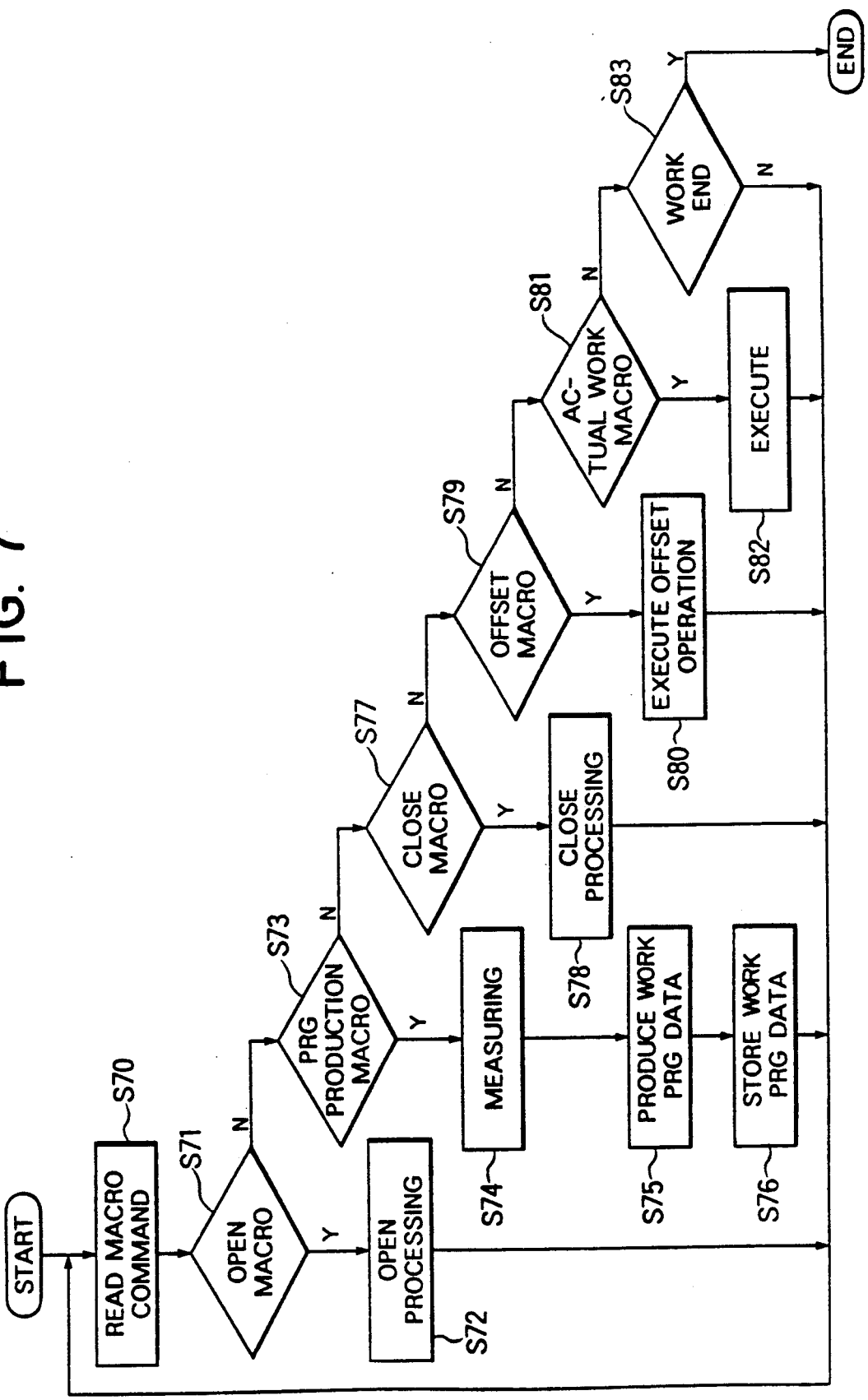
FIG. 7 is a flow chart explaining an operation of the control unit shown in FIG. 6b.

FIG. 7 is a flow chart explaining the operation of the control unit 25. Referring to FIG. 7, at step S70, the decoding portion 50 reads an NC macro command of the source work program, PROGRAM MMM, stored in the section 104D of the RAM 104, then decodes the read NC macro command at steps S71, S73, S77, S79, S81 and S83. The decoding portion then initiates a corresponding command execution portion in the command execution portion 52. When it is determined at step S71 that the read NC macro command is an open command, at step S72, the decoding portion 50 initiates the open processing portion 52A to find a sector(s) for storing a new NC work program in the RAM 104. Then, at step S73, when the read NC macro command concerns a program production, the decoding portion 50 initiates the measuring portion 52B and the program production portion 52C, to thereby measure the machining shape of the workpiece to be machined at step S74, produce an NC work program step in accordance with the measured data at step S75, and store the produced NC work program step at step S76. When it is determined at step S77 that the read NC macro command is a close command, at step S78, the decoding portion 50 initiates the close processing portion 52D to thereby terminate the production of the NC work program.

When an offset operation is requested and it is determined at step S79 that the read NC macro command is an offset command, at step S80, the decoding portion 50 initiates the offset processing portion 52F to thereby machine the workpiece in accordance with the produced NC work program at an offset state. When an actual machining operation is requested at step S81, and the read NC macro command concerns the NC machining, the decoding portion 50 initiates the machining execution portion 52G to actually carry out the machining in accordance with the NC work program at step S82. This machining operation is then continued until an end command is given at step S83.

Specifically, the above control operation is carried out by the computer system 100 shown in FIG. 6b.

The operation for producing an NC work program will now be described in detail.

Figures 8A, 8B:
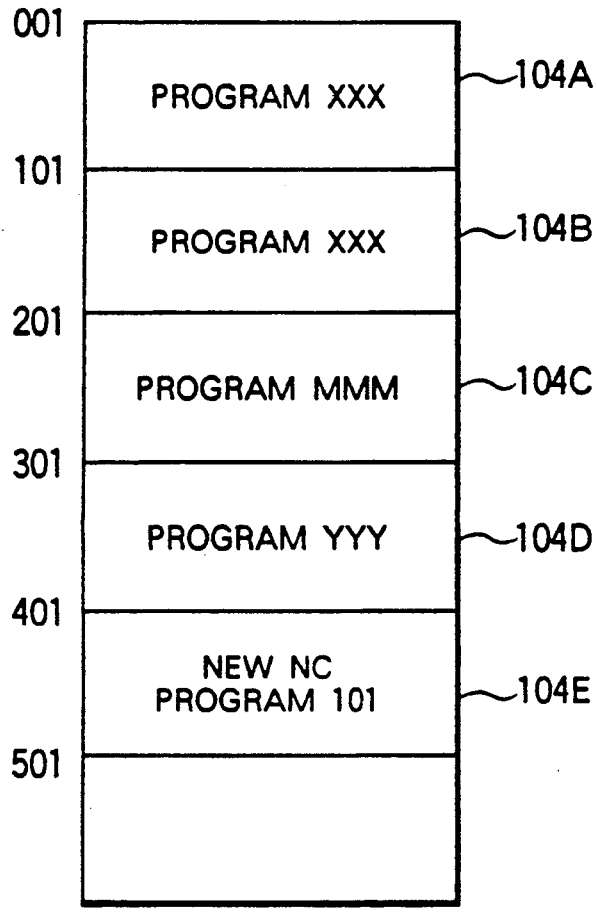
FIGS. 8a and 8b are views explaining a management of a use of sectors in a memory in the control unit shown in FIG. 6b.
Figure 9:
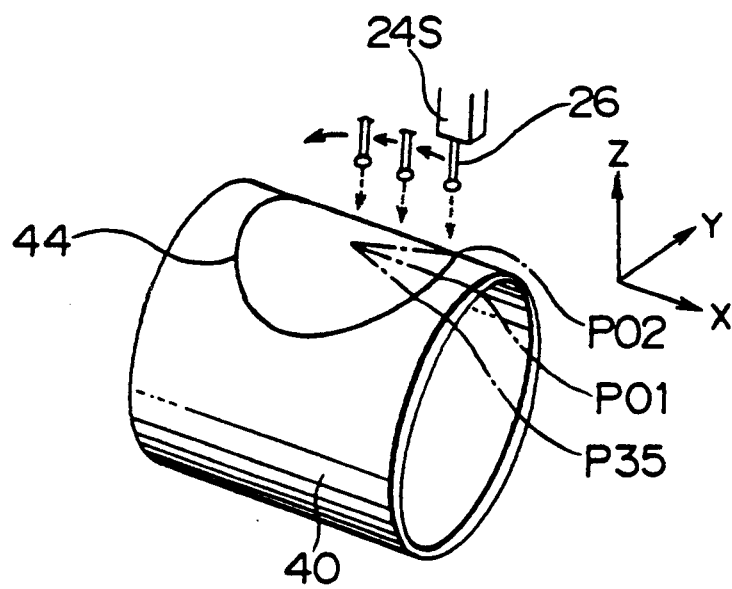
FIG. 9 is a perspective view showing a measuring of a machining shape of a workpiece to be machined.
Figure 10:
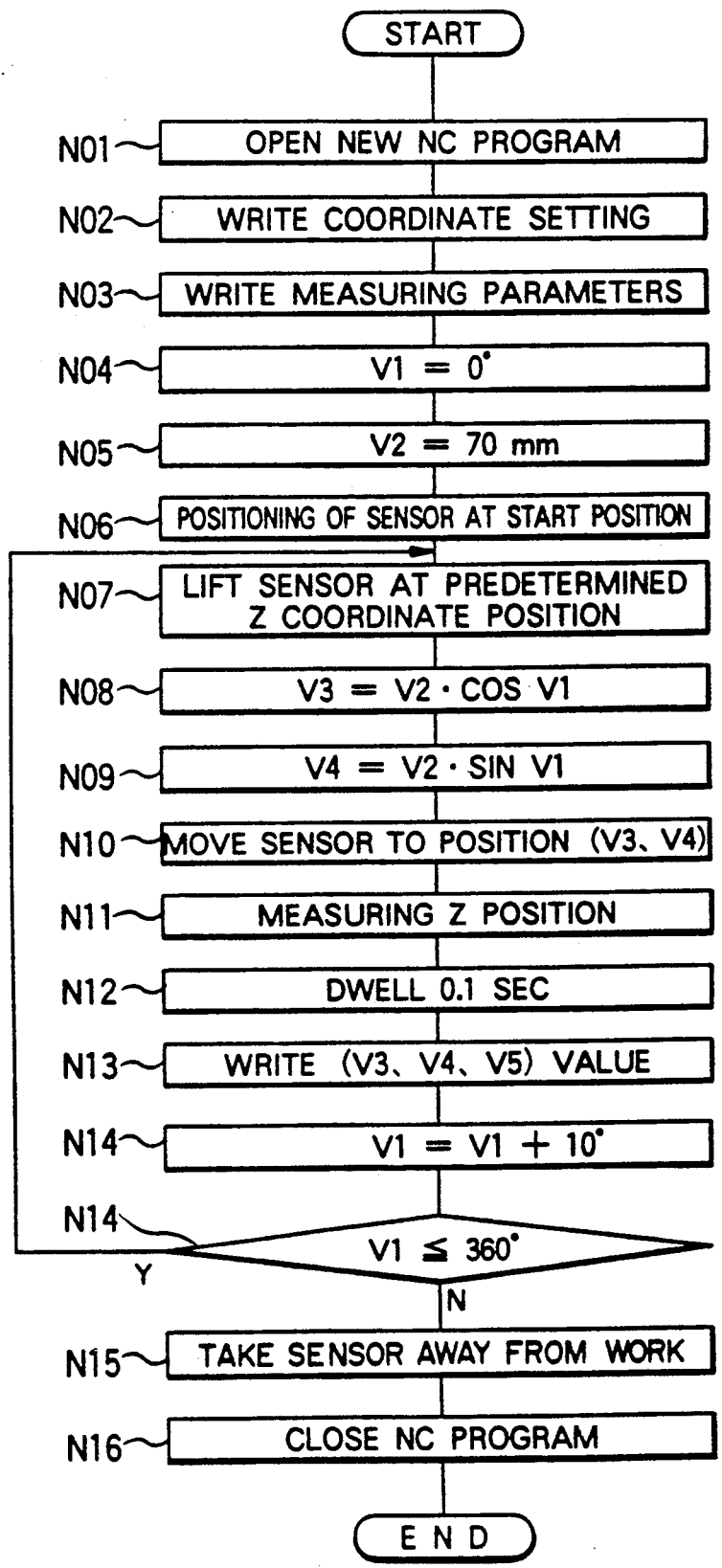
FIG. 10 is a flow chart explaining a specific operation for producing an NC work program.

FIGS. 8a and 8b are views for explaining the management of a use of the RAM 104. FIG. 9 is a perspective view of a pipe 40 as the workpiece on which the circle 44 to be machined is defined. The pipe 40 has a diameter of 110 mm, and the circle 44 has a diameter of 100 mm, similar to those shown in FIG. 4a. Table 3 shows a source work program for producing a new NC work program which is used to machine the circle 44 on the pipe 40. FIG. 10 is a flow chart explaining the production of the NC work program in accordance with the source work program shown in Table 3.

At an initial stage, the source work program shown in Table 3 is loaded in a section 104C of the RAM 104, shown in FIG. 8a, as PROGRAM MMM, and an indication thereof is stored in a directory table 105 of the RAM 104, as shown in FIG. 8b.

When an operator requests a start of the production of a new NC work program in accordance with the source work program PROGRAM MMM through the operation panel 5, the decoding portion 50 (the decoding circuit 50A) starts the decoding of the source work program PROGRAM MMM.

At program step N01 of Table 3 and FIG. 10, the decoding circuit 50A in the CPU 102 reads an NC command: POPN, 101. The NC command POPN, 101 is used for finding a free area for a new NC work program having the number 101 and declaring a use of the area. A size of the NC work program is designated by the operator through the operation panel 5. Then, the decoding circuit 50A initiates an open processing control program stored in the ROM 106, and the open processing control program is operated in the CPU 102 to find a free area in which the new NC work program can be stored in the RAM 104.

The open processing will be now described in more detail. In the RAM 104, a work program storage area shown in FIG. 8a and a directory table 105 shown in FIG. 8b are defined. The directory table 105 stores program names, start addresses of sectors of the work, program storage area, and sizes of the sectors. Each sector has 512 bytes. As an initial condition, all data in the directory table 105 is cleared to zero indicating an empty state thereof. Referring to FIGS. 8a and 8b, the directory table 105 indicates that a first NC work program PROGRAM XXX having a size of two sectors is stored in first and second sectors 104A and 104B having a start address 001, the source work program PROGRAM MMM shown in Table 3 and having a size of one sector is stored in a third sector 104C having a start address 201, and a second NC work program PROGRAM YYY having a size of one sector is stored in a fourth sector 104D having a start address 301. When the operator designates a cancellation of any work program with a program number thereof, a corresponding area of the directory table 105 is cleared. Namely, the directory table 105 is used for managing the use of the program storage area in the RAM 104.

At this time, data in a fourth area in the directory table 105, subsequent to a third area stored the information of PROGRAM YYY is all zero. Then, the open processing program finds a free sector 104 for storing the new NC work program 101 in accordance with the content of the directory table 105, and stores a program number 101 designated by the program step NO1, a start address 401 of the sector 104E and a size of one sector in the directory table 105. At the same time, the open processing program stores the program number 0101 to the start address 401 of the sector 104E, as shown in Table 4.

At program step NO2 of Table 3 and FIG. 10, a program write macro command is decoded by the decoding circuit 50A, and a measuring processing program stored in the ROM 106 is initiated by the decoding circuit 50A. Here, the program write macro command PWRT, (G92YOYOZ100) indicates the following:

PWRT indicates a program write command,
G92 indicates a command for setting coordinates at an absolute value,
X0 indicates that an X coordinate is 0 mm,
Y0 indicates that a Y coordinate is 0 mm, and
Z100 indicates that a Z coordinate is 100 mm.

The measuring processing program stores an NC command: G92XOYOZ100 to an address 402, as shown in Table 4.

At program step NO3, the measuring processing program is also initiated by the decoding circuit 50A, and stores an NC command: G90G01F1000 to an address of 403 of the sector 104E as shown in Table 4. This NC command indicates that the touch sensor 26 is moved in a line interpolation manner at a movement speed of 1000 mm/min.

A NC code V1=0 at program step N04 indicates that a first variable indicating an angle is zero, and an NC code V2=70 at program step N05 indicates that a second variable indicates a radius of the circle 44 on the pipe 40; this radius being 70 mm. These variables V1 and V2 are held in the measuring processing program.

At program step N06, the measuring processing program initiated by the decoding circuit 50A moves the touch sensor 26 to a start position on the pipe 40 shown in FIG. 9. Here, a code G00 indicates a command for moving the touch sensor 28 (or the tool). The start position is defined as X=V2 (70 mm), Y=0 (mm), and Z=150 (mm).

At program step N07, the measuring processing program initiated by the decoding circuit 50A moves the touch sensor 26 down from Z=150 (mm) to Z=100 (mm) until the touch sensor 26 abuts against a surface of the pipe 40.

At program steps N08 to N13, the measuring processing program moves the touch sensor 26 along the machining locus of the circle 44 of the pipe 40. In accordance with NC commands at program steps N08 to N12, and measures a position, specifically the Z position, of the touch sensor 25. The program production program stored in the ROM 106 reads data measured by the measuring processing program, then produces and stores an NC work program, in accordance with a program write macro command at program step N13. Here, a command: V3=[V2]* COS [V1] at program step N08 indicates that a third variable indicating the X coordinate is calculated by the formula: V2* cos (V1), a command: V4=[V2]* SIN [V1] at program step N09 indicates that a fourth variable indicating the Y coordinate is calculated by the formula: V2* sin (V1), a command: G90G00X[V3] Y [V4] at program step N10 indicates that the touch sensor 26 is positioned at a coordinate of X=V3 and Y=V4, a command: G61Z50F3000 at program step N11 indicates that the touch sensor 26 is moved down to the Z coordinate of 50 mm at a movement speed of 3000 mm/min, a command: G04F0.1 at program step N12 indicates a dwelling for 0.1 second, and a command: PWRT, (X)V3 [53], Y (V4) [53], (Z) V5 [53] at program step N13 indicates that an NC work command consisting of the calculated X coordinate represented by the third variable V3, the calculated Y coordinate represented by the fourth variable V4 and the measured Z coordinate represented by the fifth variable V5 is stored as XXXXX,XXX (mm); i.e., five digits for a value over 1 mm, and three digits for another value less than 1 mm.

According to the operation carried out by the program steps N08 to N11, the touch sensor 26 is moved down to the Z coordinate of 50 mm, but the touch sensor 26 abuts against the surface of the pipe 40 before the touch sensor 28 is moved down to the Z coordinate of 50 mm. The measuring processing program detects the abutting and allows the touch sensor 26 to dwell, as is. After the elapse of the dwelling time of 0.1 second, the measuring processing program reads the Z coordinate of the touch sensor 26, and outputs the measured value to the program production program. At this initial condition, the X coordinate is 70 mm, the Y coordinate is 0 mm, and the measured Z coordinate is 100 mm. The program production program then stores the coordinates to an address of 404 to the sector 104E, as shown in Table 4.

At program step N14, the measuring processing program initiated by the decoding program 50A increases the first variable V1, indicating the angle, by 10 degrees, in accordance with a command: V1=V1+10, and determines whether or not the first variable V1 is greater than 360 degrees. If the first variable V1 is not greater than 360 degrees, the program control is transferred to the program step N07, and the operation described above is repeated. As a result, 37 NC work commands forming the NC work program are sequentially stored in the sector 104E from the address 404 to the address 440, as shown in Table 4.

At program step N15, the measuring processing program initiated by the decoding circuit 50A moves up the touch sensor 2b up to 150 mm in the Z direction, in accordance with a command: Z150.

At program step N16, the decoding circuit 50A decodes a program close command: PCLS, 101, and initiates a close processing program stored in the ROM 106. At program step N17, the close processing program stores a code: M02 to the latest address 441 in the sector 104E.

As described above, the touch sensor 26 is moved along the machining locus of the circle 44 on the pipe 40 as shown in FIG. 9, and the new NC work program is thus automatically produced and stored in the RAM 104.

Figure 12:
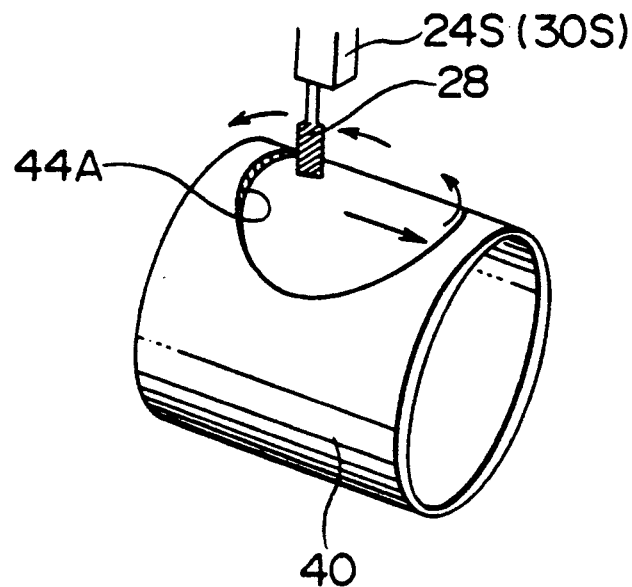
FIG. 12 is a perspective view showing an actual machining of a workplace.

Thereafter, the operator removes the touch sensor 26 attached to the spindle 26S of the NC machine Z4 and attaches a drill 28 to the spindle 24S. Then, the operator requests a machining of the pipe 40, in accordance with the newly produced NC work program 101 stored in the sector 104E of the ROM 104 through the operation panel 5, and an actual machining of the pipe 40 is carried out in accordance with the NC work program 101, as shown in FIG. 12.

Referring to FIG. 7, in this actual machining, the decoding portion 50 (the decoding circuit 50A) decodes the NC work program and initiates the command execution portion 52G (a command execution program stored in the ROM 104). The command execution portion 52G executes sequentially each NC command of the NC work program, as in the prior art.

Figure 11:
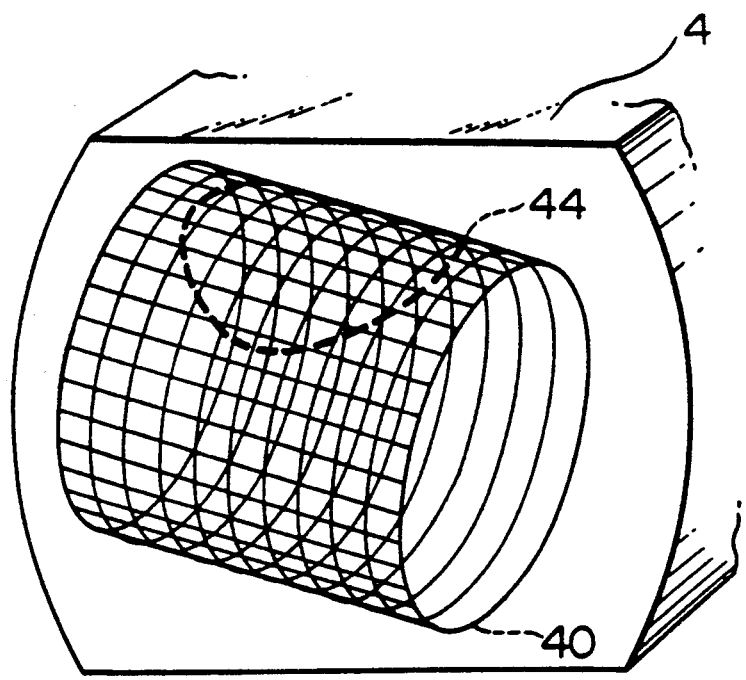
FIG. 11 is a view showing a simulated result of the NC work program of FIG. 10.

Prior to the actual machining, if the operator requests a simulation of the produced NC work program 101 through the operator panel 5, a simulation program stored in the ROM 106 is initiated. The simulation program analyzes the NC work program 101 stored in the sector 104E of the RAM 104, calculates and interpolates coordinate data, and displays the resultant spacial data on the CRT display unit 4, as shown in FIG. 11.

Further, if the operator requests an offset operation of the produced NC work program 101 through the operator panel 5, prior to the actual machining, an offset processing program stored in the ROM 106 is initiated by the decoding circuit 50A. The offset processing program functions in the same way as the command execution program, but in this offset operation mode, the touch sensor 2b or the drill 28 is lifted by an offset value, for example, 50 mm, in the Z coordinate direction, to prevent an abutting thereof against the pipe 40, and then moved in accordance with the NC work program 101.

The source work program MMM shown in Table 3 is applied to not only the circle 44 on the pipe 40 as shown in FIG. 9 but also a similar circle machining shape, and another new NC work program will be produced in the same manner as described above. When a new NC work program for a machining shape other than a circle is required, for example, a new NC work program for a trianglular shape is required, however, a new source work program for the trianglular shape must be loaded.

Figure 13:
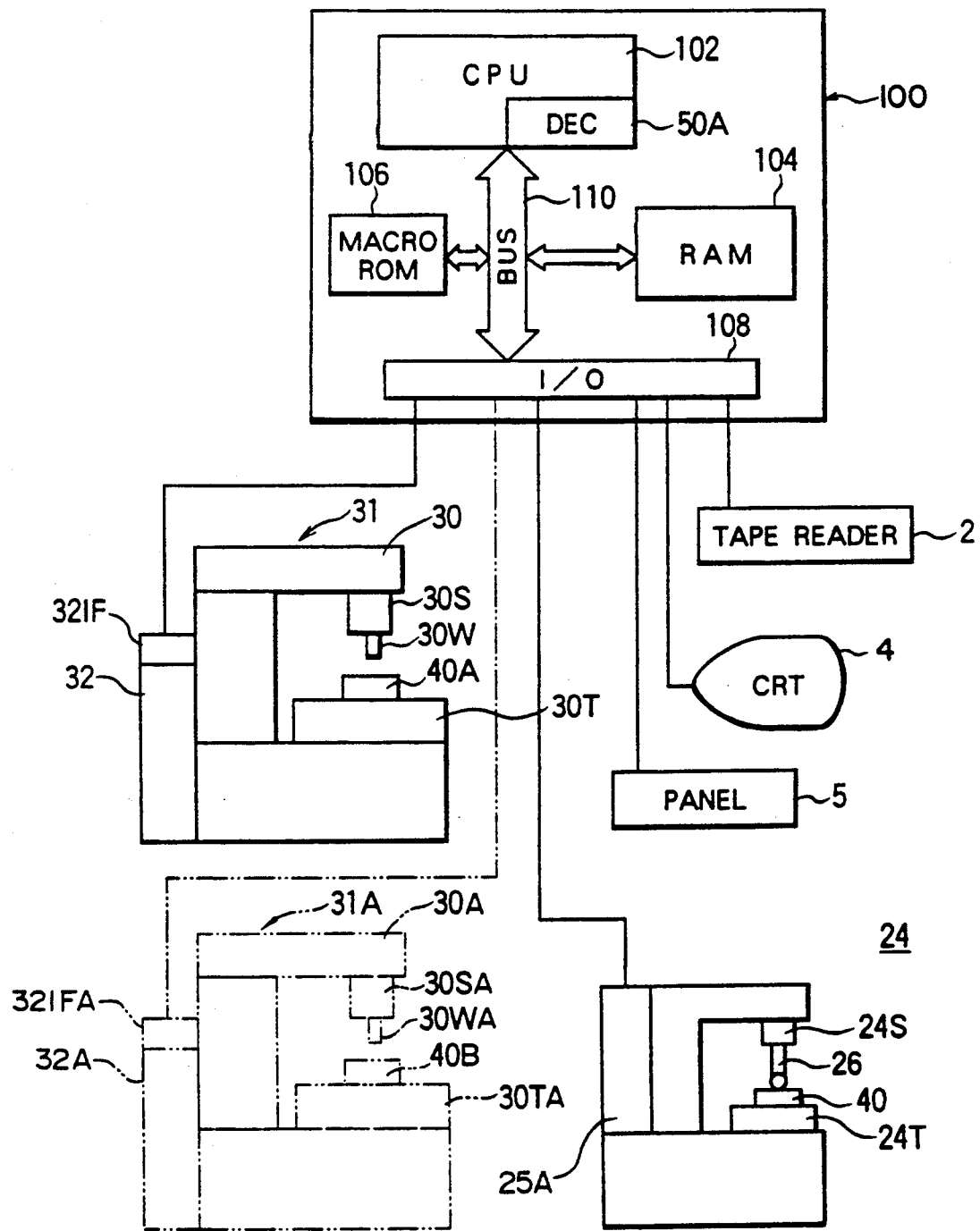
FIG. 13 is a block diagram of a CNC machine tool system as a third embodiment of the present invention.

FIG. 13 is a diagram of a CNC machine tool system of a third embodiment in accordance with the present invention. The CNC machine tool system includes the first NC machine tool apparatus consisting of the NC machine 24 and the computer system 100, and two NC machine tool apparatuses 30 and 30A. The NC machine tool apparatuses 30 and 30A respectively include NC machines 30, 30A and control units 32, 32A. The NC machine 30, 30A are substantially the same as the NC machine 24. Each control unit 32, 32A includes a memory, similar to the RAM 104, for storing NC work programs, a CPU including a decoding circuit similar to the CPU 102, and a ROM, similar to the ROM 106, for storing control programs. The ROM in each control unit 32, 32A includes at least a command execution program for executing the NC work program stored in the memory therein. Each control unit 32, 32A inputs the NC work program produced at the computer system 100 of the first NC machine tool apparatus, set forth above, through interface units 32IF, 32IFA. After the NC work program is transferred to the control units 32, 32A, the NC machines 24, 30 and 30A can simultaneously machine the workpieces 40, 40A and 40B in accordance with the same NC work program. As a result, a plurality of workpieces can be simultaneously and efficiently machined under a same condition.

Alternatively, each control unit 32, 32A may be constructed in the same way as the control unit 25, including the computer system 100 for producing a new NC work program therein.

Many widely different embodiments of the present invention may be constructed without departing from the spirit and scope of the present invention, and it should be understood that the present invention is not restricted to the specific embodiments described above.

TABLE 1

| 088 | |
| --- | --- |
| N01 | [V25=999] |
| N02 | [V1=50. V10=80. VF=300] |
| N03 | [V21=0. V22=0. V23=0. V2=5] |
| N04 | [V11=V10*V10] |
| N05 | [V26=V23+V10. V27=V23+1. 2*V10] |
| N06 | [POPN. V25] |
| N07 | /G92X [V21] Y [V22] Z [V27] |
| N08 | /G90G00X [V21] Y [V22] |
| N09 | /Z [V26] |
| N10 | [PWRT. (G92X) V21 [43]. (Y) V22 [43]. (Z) V27 [43]] |
| N11 | [PWRT. (G90G00X) V21 [43]. (Y) V22 [43]] |
| N12 | [PWRT. (Z) V26 [43]] |
| N13 | /G01F [VF] |
| N14 | [PWRT. (G01F) VF [30]] |
| N15 | [V5=0] |
| N16 | N100 [VX=V1*COS[V5]+V21. VY=V1*SIN[V5]+22] |
| N17 | [VZ=SQRT [V11−VY*VY]+V23] |
| N18 | /X [VX] Y [VY] Z [VZ] |
| N19 | [PWRT. (X) VX [43]. (Y) VY [43]. (Z) VZ [43]] |
| N20 | [V5=V5+V2. IF. V5<=360. GO. −100] |
| N21 | /G00X [V21]]Y [V22] |
| N22 | /Z [V26] |
| N23 | [PWRT. (G00X) V21 [43]. (Y) V22 [43]] |
| N24 | [PWRT. (Z) V26 [43]] |
| N25 | [PCLS. V25] |
| N26 | M02 |

TABLE 2

| ADDRESS | NC WORK PROGRAM |
| --- | --- |
| 1 | 0999 |
| 2 | G92X0Y0Z96. 000 |
| 3 | G90G00X0Y0 |
| 4 | Z80F000 |
| 5 | G010300 |
| 6 | X50. 000Y0Z80. 000 |
| 7 | X49. 810Y4. 358Z79. 881 |
| 8 | X49. 240Y8. 682Z79. 527 |
| 9 | X48. 296Y12. 941Z78. 946 |
| 10 | X46. 985Y17. 101Z78. 151 |
| 11 | X45. 315Y21. 131Z77. 159 |
| 12 | X43. 301Y25. 000Z75. 983 |

TABLE 2-continued

| ADDRESS | NC WORK PROGRAM |
|---|---|
| 13 | X40. 958Y28. 679Z74. 683 |
| 14 | X38. 302Y32. 139Z73. 280 |
| 15 | X35. 355Y35. 355Z71. 764 |
| 16 | X32. 139Y38. 302Z70. 235 |
| 17 | X28. 679Y40. 958Z68. 720 |
| 18 | X25. 000Y43. 301Z67. 268 |
| 19 | X21. 131Y45. 315Z65. 928 |
| 20 | X17. 101Y46. 985Z64. 749 |
| 21 | X126941Y48. 296Z63. 777 |
| 22 | X8. 382Y49. 240Z63. 051 |
| 23 | X4. 558Y49. 810Z62. 602 |
| 24 | X0Y. 0. 000Z62. 450 |
| 25 | X−4. 358Y49. 810Z62. 602 |
| 26 | X−82682Y49. 240Z63. 051 |
| 27 | X−17. 941Y48. 296Z63. 777 |
| 28 | X−11. 101Y46. 985Z64. 749 |
| 29 | X−25. 131Y45. 315Z65. 928 |
| 30 | X−28. 000Y43. 301Z67. 268 |
| 31 | X−22. 679Y40. 958Z68. 720 |
| 32 | X−35. 139Y38. 302Z70. 235 |
| 33 | X−38. 355Y35. 355Z71. 764 |
| 34 | X−30. 302Y32. 139Z73. 260 |
| 35 | X−43. 958Y28. 679Z74. 683 |
| 36 | X−45. 301Y25. 000Z75. 993 |
| 37 | X−46. 315Y21. 131Z77. 159 |
| 38 | X−48. 985Y17. 101Z78. 151 |
| 39 | X−49. 296Y12. 941Z78. 946 |
| 40 | X−4. 240Y8. 682Z79. 527 |
| 41 | X−49. 810Y4. 358Z79. 881 |
| 42 | X−50. 000Y0Z80. 000 |
| 43 | X−49. 810Y−4. 358Z79. 881 |
| 44 | X−49. 240Y−8. 682Z79. 527 |
| 45 | X−48. 296Y−12. 941Z78. 946 |
| 46 | X−46. 985Y−17. 101Z78. 151 |
| 47 | X−45. 315Y−21. 131Z77. 159 |
| 48 | X−43. 301Y−25. 000Z74. 993 |
| 49 | X−40. 958Y−28. 679Z74. 683 |
| 50 | X−38. 302Y−32. 139Z73. 260 |
| 51 | X−35. 355Y−35. 355Z71. 764 |
| 52 | X−32. 139Y−38. 302Z70. 235 |
| 53 | X−28. 679Y−40. 958Z68. 720 |
| 54 | X−25. 000Y−43. 301Z67. 268 |
| 55 | X−21. 131Y−45. 315Z65. 928 |
| 56 | X−17. 101Y−46. 985Z64. 749 |
| 57 | X−12. 941Y−48. 296Z63. 777 |
| 58 | X−8. 682Y−49. 240Z63. 051 |
| 59 | X−4. 358Y−49. 810Z62. 602 |
| 60 | X0Y−50. 000Z62. 450 |
| 61 | X4. 358Y−49. 810Z62. 602 |
| 62 | X8. 682Y−49. 240Z63. 051 |
| 63 | X12. 941Y−48. 296Z63. 777 |
| 64 | X17. 101Y−46. 985Z64. 749 |
| 65 | X21. 131Y−45. 315Z65. 928 |
| 66 | X25. 000Y−43. 301Z67. 268 |
| 67 | X28. 679Y−40. 958Z68. 720 |
| 68 | X32. 139Y−38. 302Z70. 235 |
| 69 | X35. 355Y−35. 355Z71. 764 |
| 70 | X38. 302Y−32. 139Z73. 260 |
| 71 | X40. 958Y−28. 679Z74. 683 |
| 72 | X43. 301Y−25. 000Z75. 983 |
| 73 | X45. 315Y−21. 131Z77. 159 |
| 74 | X46. 985Y−17. 101Z78. 151 |
| 75 | X48. 296Y−12. 941Z78. 946 |
| 76 | X49. 240Y−8. 682Z78. 527 |
| 77 | X49. 810Y−4. 358Z79. 881 |
| 78 | X50. 000Y0Z80. 000 |
| 79 | G00X0Y0 |
| 80 | Z80. 000 |
| 81 | M02 |

TABLE 3

| OMMM | |
|---|---|
| N01 | [POPN. 101] |
| N02 | [PWRT. (G92X0Y0Z100)] |
| N03 | [PWRT. (G90G01F1000)] |
| N04 | [V1=0] |
| N05 | [V2=70] |
| N06 | G90G00X [V2] Y0Z150 |

TABLE 3-continued

| OMMM | |
|---|---|
| N07 | G00Z110 |
| N08 | [V3=[V2]*COS [V1]] |
| N09 | [V4=[V2]*SIN [V1]] |
| N10 | G90G00X [V3] Y [V4] |
| N11 | G61Z50F3000 |
| N12 | G04F0. 1 |
| N13 | [PWRT. (X) V3 [53]. (Y) V4 [53]. (Z) V5 [53]] |
| N14 | [V1=V1+10. 1F. V1< =360. G0. −7] |
| N15 | Z150 |
| N16 | [PCLS. 101] |
| N17 | M02 |

TABLE 4

| ADDRESS | NC WORK PROGRAM |
|---|---|
| 401 | O101 |
| 402 | G92XG92X0Y0Z100 |
| 403 | G90G01F100 |
| 404 | X70. 000Y0Z100. 000 |
| 405 | X68. 937Y12. 155Z99. 258 |
| 406 | X65. 778Y23. 941Z97. 092 |
| 407 | X60. 622Y35. 000Z93. 675 |
| 408 | X53. 623Y44. 995Z89. 305 |
| 409 | X44. 995Y53. 623Z84. 407 |
| 410 | X35. 000Y60. 622Z79. 530 |
| 411 | X23. 941Y65. 778Z75. 321 |
| 412 | X12. 155Y68. 937Z72. 441 |
| 413 | X0Y70. 000Z71. 414 |
| 414 | X−12. 155Y68. 937Z72. 441 |
| 415 | X−23. 941Y65. 778Z75. 321 |
| 416 | X−35. 000Y60. 622Z79. 530 |
| 417 | X−44. 995Y53. 623Z84. 407 |
| 418 | X−53. 623Y44. 995Z89. 305 |
| 419 | X−60. 622Y35. 000Z93. 675 |
| 420 | X−65. 778Y23. 941Z97. 092 |
| 421 | X−68. 937Y12. 155Z99. 258 |
| 422 | X−70. 000Y0Z100. 000 |
| 423 | X−68. 937Y−12. 155Z99. 258 |
| 424 | X−65. 778Y−23. 941Z97. 092 |
| 425 | X−60. 622Y−35. 000Z93. 675 |
| 426 | X−53. 623Y−44. 995Z89. 305 |
| 427 | X−44. 995Y−53. 623Z84. 407 |
| 428 | X−35. 000Y−60. 622Z79. 530 |
| 429 | X−23. 941Y−65. 778Z75. 321 |
| 430 | X−12. 155Y−68. 935Z72. 441 |
| 431 | X0Y−70. 000Z71. 414 |
| 432 | X12. 155Y−68. 937Z72. 441 |
| 433 | X23. 941Y−65. 778Z75. 321 |
| 434 | X35. 000Y−60. 622Z79. 530 |
| 435 | X44. 995Y−53. 623Z84. 407 |
| 436 | X53. 623Y−44. 995Z89. 305 |
| 437 | X60. 622Y−35. 000Z93. 675 |
| 438 | X65. 778Y−23. 941Z97. 092 |
| 439 | X68. 937Y−12. 155Z99. 258 |
| 440 | X70. 000Y0Z100. 000 |
| 441 | M02 |

We claim:

1. An NC tool apparatus comprising:

an NC machine including at least one spindle to which a tool or a sensing device is attached, and a drive mechanism for driving said spindle; and a control unit for controlling said drive mechansim, said control unit comprising an NC work program producing means for producing, in accordance with a source work program, an NC work program for machining a workpiece, said source work program specifying a pattern to be machined on said workpiece, said NC work program producing means controlling said NC machine to move said sensing device attached to said spindle in accordance with said pattern to measure said workpiece, said NC work program producing means creating an NC work program for controlling said drive mechanism, in accordance with said measurements.

2. An NC machine tool apparatus according to claim 1, wherein said NC work program producing means comprises:
a memory means for storing said source work program and said NC work program;
a measurement means for measuring said workpiece; and
a program producing means, cooperating with said measurement means, for producing the NC work program in accordance with said measurements, said program producing means stores said measurements in an area of said memory means.

3. An NC machine tool apparatus according to claim 2, wherein said control unit further comprises an open processing means for finding a free area in said memory means into which said NC work program is stored, said open processing means registers a name of said NC work program, a start address of said free area, and a size of said NC work program.

4. An NC machine tool apparatus according to claim 3, wherein said memory means comprises a work program storage area divided into a plurality of sectors, said sectors are defined by a unit size and store said source work program, said NC work program, and a directory table indicating a use of said sectors; and wherein said open processing means finds a free area in accordance with contents of said directory table.

5. An NC machine tool apparatus according to claim 4, wherein said control unit further comprises a close processing means for storing an end code in the last address location of said NC work program, said end code indicates the end of the NC work program.

6. An NC machine tool apparatus according to claim 1, wherein said control unit further comprises a simulation means for calculating a machining locus on the basis of said produced NC work program for illustrating said machining locus as a perspective spatial figure, and for outputting the calculated machining locus in the perspective spatial figure.

7. An NC machine tool apparatus according to claim 1, wherein said control unit further comprises an offset operation means for moving said spindle in accordance with offset NC work data, said offset NC work data is obtained by adding a predetermined offset value to contents of said produced NC work program, said offset operation means moves the sensing device or the tool attached to the spindle, according to the NC work program, said tool being offset from said workpiece.

8. An NC machine tool apparatus according to claim 1, wherein said control unit further comprises a machining execution means for machining the workpiece held in said NC machine, said execution means machines said workpiece in accordance with said NC work program.

9. An NC machine tool apparatus according to claim 1, wherein said source work program is written in an NC programming language, and said NC work program is represented by an NC control language.

10. An NC machine tool apparatus according to claim 1, wherein said control unit has a program production mode and a machining mode, said control unit further comprises a decoding means for decoding commands, when said control unit is in said program production mode, said decoding means reads said source work program, decodes a command for producing the NC work program and initiates said NC work program producing means to thereby produce said NC work program, when said control unit is in said machining mode, said decoding means reads said produced NC work program, decodes a command for machining said workpiece and initiates machining execution to thereby machine the workpiece with said tool in accordance with said NC work program.

11. An NC machine tool apparatus according to claim 10, wherein said control unit comprises a computer means for producing said NC work program in accordance with said source work program and executing said produced NC work program to machine the workpiece.

12. An NC machine tool apparatus according to claim 1, further comprising an operator panel connected to said control unit, said panel used as a man-machine interface between an operator and the NC machine tool apparatus.

13. An NC machine tool system comprising a first NC machine tool apparatus and a second NC machine tool apparatus connected to said first NC machine tool apparatus,
said first NC machine tool apparatus comprising:
a first NC machine including at least one spindle to which a tool or a sensing device is attached, and a drive mechanism for driving said spindle, and
a first control unit for controlling said drive mechanism, said control unit comprising an NC work program producing means for producing, in accordance with a source work program, an NC work program for machining a workpiece, said source work program specifying a pattern to be machined on said workpiece, said NC work program producing means controlling said drive mechanism, in accordance with said measurements; and
said second NC machine tool apparatus comprising:
a second NC machine having at least a second spindle to which a second tool is attached, and a second drive mechanism for driving said second spindle; and
a second control unit controlling said second drive mechanism said second control unit comprising:
means for inputting said produced NC work program from said first control means; and
a machining execution means for executing the machining of a workpiece held in said second NC machine in accordance with said input NC work program.

14. A method of producing an NC work program in an NC machine tool apparatus comprising an NC machine having at least one spindle to which a tool or a sensing device is attached, and a drive mechanism for driving said spindle, including the steps of:
initiating a source work program which defines a predetermined pattern to be machined;
measuring a machining locus of a workpiece in accordance with said source work program, said workpiece held in said NC machine and said measuring accomplished with said sensing device attached to said spindle in accordance with said source work program;
producing an NC work program based on said measured machining locus and said source work program.

15. A method of producing an NC work program according to claim 14, further including the steps of:
finding a free area in which said produced NC work program can be stored; and registering a name of said produced NC work program, a start address of the free area, and a size of said produced NC work program at the start address of said free area.

16. A method of producing an NC work program according to claim 15, wherein said finding of the free area and registering a name is carried out by using a directory table indicating a use of areas in which NC work programs and source work programs are stored.

17. A method of producing an NC work program according to claim 15, further including the step of storing an end code indicating an end of the produced NC work program to the last address of the area in which the produced NC work program is stored.

18. A machine tool apparatus comprising:
a machining machine including at least one spindle to which a sensor device is attached, and a drive mechanism for driving said spindle; and
a control unit for controlling said drive mechanism, said control unit comprising:
a source work program which defines a predetermined pattern; and
a program producing means for executing said source work program and creating a first NC work program for machining a first workpiece, said program producing means controlling said NC machine to move said sensing device attached to said spindle in accordance with said pattern and measuring said workpiece, said program producing means creating a first NC work program for controlling said drive mechanism in accordance with said first measurements.

19. The machine tool apparatus of claim 18, wherein said program producing means executes said source work program to create a second NC program for machining a second workpiece, said program producing means controlling said NC machine to move said sensing device attached to said spindle in accordance with said pattern and measuring said second workpiece, said program producing means creating a second NC work program for controlling said drive mechanism in accordance with said measurements of said second workpiece.

* * * * *